May 29, 1956 — E. H. BLATTNER — 2,747,696
SNUBBER ATTACHING MEANS
Filed May 15, 1951 — 3 Sheets-Sheet 1

Inventor:
Emil H. Blattner
By his Attorney

May 29, 1956  E. H. BLATTNER  2,747,696
SNUBBER ATTACHING MEANS
Filed May 15, 1951  3 Sheets-Sheet 2
FIG. 4
FIG. 5
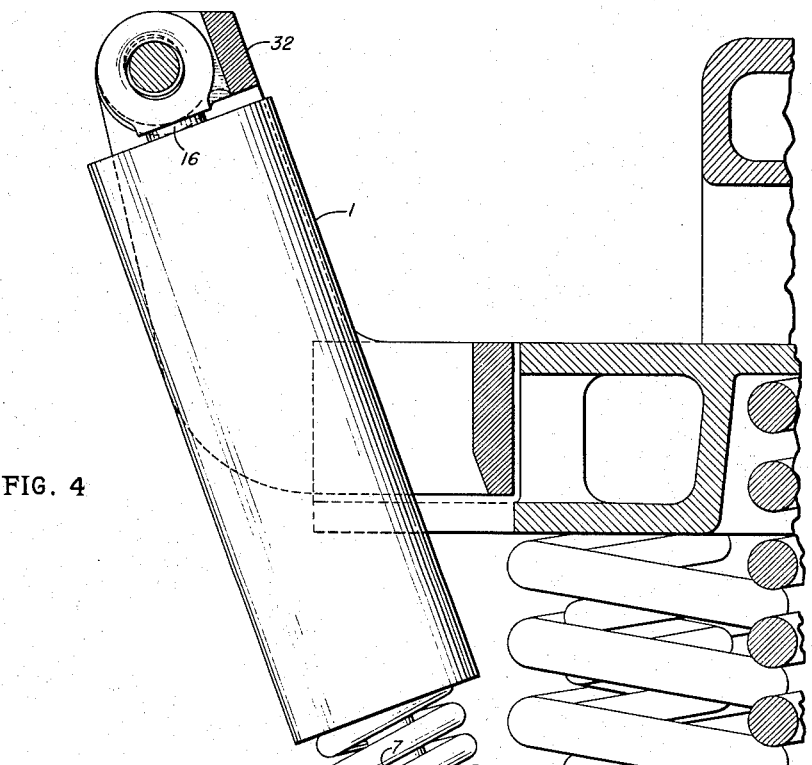
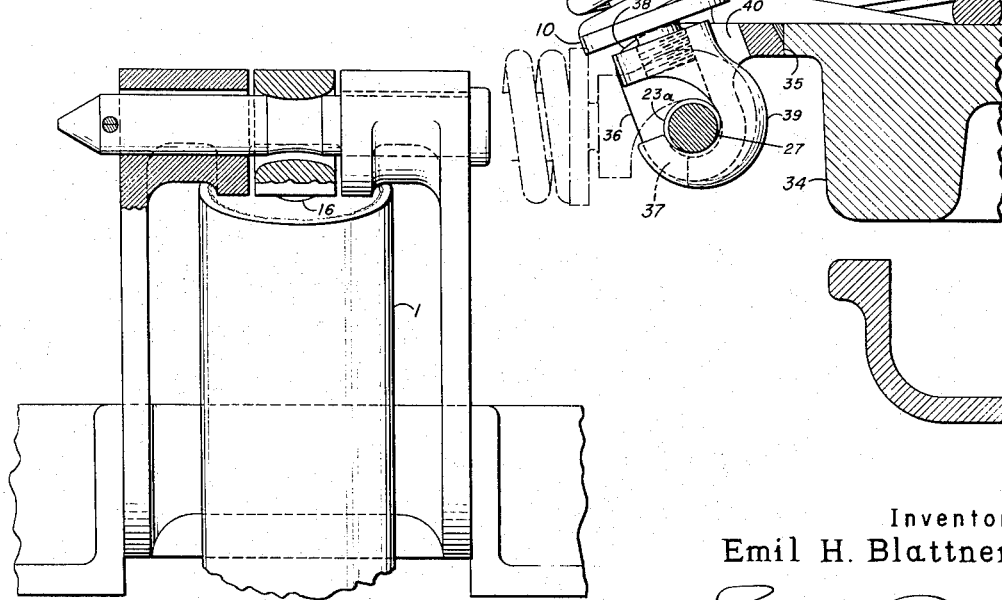
Inventor
Emil H. Blattner
By
his Attorney May 29, 1956 E. H. BLATTNER 2,747,696
SNUBBER ATTACHING MEANS
Filed May 15, 1951 3 Sheets-Sheet 3
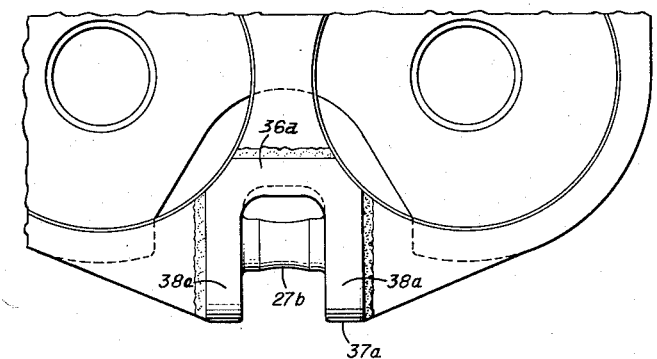
FIG. 6
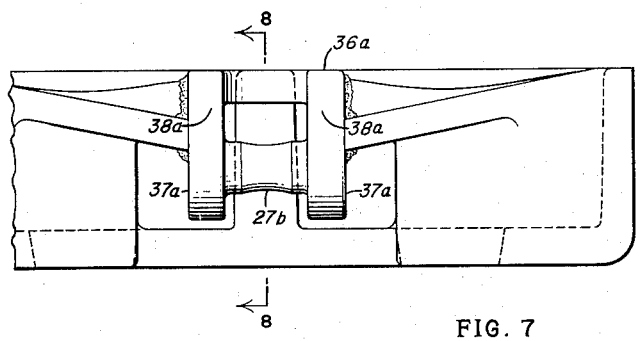
FIG. 7
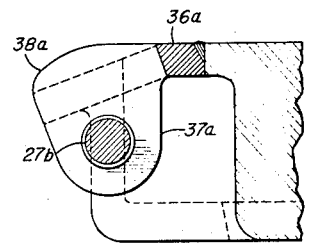
FIG. 8
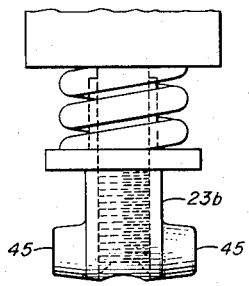
FIG. 9
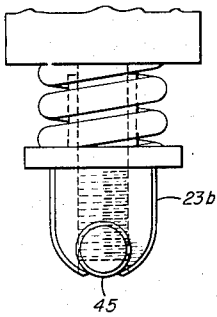
FIG. 10
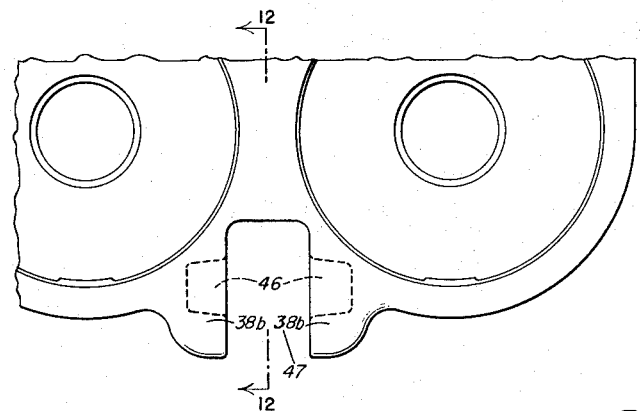
FIG. 11
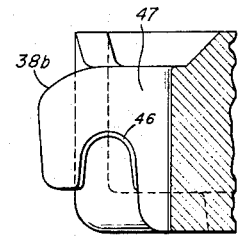
FIG. 12
Inventor:
Emil H. Blattner
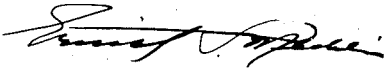
By
his Attorney United States Patent Office 2,747,696
Patented May 29, 1956

2,747,696
SNUBBER ATTACHING MEANS

Emil H. Blattner, Williamsville, N. Y., assignor to The Symington-Gould Corporation, Depew, N. Y., a corporation of New York Application May 15, 1951, Serial No. 226,477

19 Claims. (Cl. 188—129)

This invention relates to four-wheel railway car trucks and more particularly to means for frictionally resisting relative movement of the bolster and truck.

The principal object of the invention, generally stated, is to provide frictional resistance means, commonly called a snubber, in connection with the truck but spaced from the column guides and spring nest, said snubber being connected to the truck frame and bolster so as to interpose a frictional resistance to their relative movement.

Still another object of the invention is to provide in connection with a truck of the type described, a snubber or frictional resistance unit which can be applied or removed from the truck without dismantling any other portion thereof, by application of hammer blows to the connecting means.

Still another object of the invention is to so connect a snubber as to permit the assembly thereof with adjacent parts of a car truck so as to place the snubber under an increased compression, the increased compression being such that the wear of the parts will be compensated for during the life of the said parts.

A still further object of the invention is to provide a snubber with takeup springs so that the connection between the snubber and the bolster and spring plank will remain tight at all times.

A still further object of the invention is to provide in the snubber housing a takeup spring whose capacity is in excess of the capacity of the combined spring and friction mechanism of the standard snubber construction, and to provide means for limiting the amount of compression that can be applied to said spring.

Still another object of the invention is to provide snubber attaching eyes with pin-receiving openings and to provide the cooperating clevis members on the truck with offset pin-receiving openings, the openings in the eyes and clevis being non-concentric so that a pin passed through said overlapping openings will engage the clevis on one side of the pin and the snubber eye on the opposite side, causing the relative movement of said parts, to increase the preliminary spring compression of said snubber spring to take up slack in the connection.

A still further object of the invention is to provide a pin for connecting said snubber to an adjacent part of said truck, said pin having a tapered end and intermediate its end being provided with a concave segmented portion in its peripheral surface, said pin surface when said pin is in connecting position permitting a rocking motion between the snubber and car truck transverse to the truck bolster.

Other objects and advantages of my invention will more clearly appear from the detailed description of the same, particularly when taken in connection with the accompanying drawings, in which:

Figure 4 is a view partially in elevation and partially in vertical section of a car truck and associated snubber, the lower snubber connection being modified to engage a pin or an integral portion of the car truck, said figure illustrating in dotted lines the method of assembling of such a snubber and truck.

Figure 5 is a fragmentary view partially in section, taken at right-angles to the direction of view of Figure 4.

Figures 6, 7 and 8 are fragmentary detailed views illustrating the spring plank modified to receive the modified form of the snubber connection shown in Figure 4, Figure 8 being a section on the line 8—8 of Figure 7.

Figures 9, 10, 11 and 12 are fragmentary detailed views of a modified bolt head for the snubber bolt and a spring plank devised to cooperate therewith, Figure 12 being a section on the line 12—12 of Figure 11.

Figure 3:
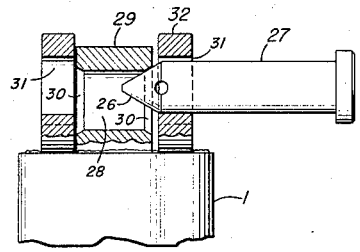
Figure 3 is a fragmentary view similar to Figure 1, showing the method of assembling the clevis and eye members of that figure.

Throughout the specification and drawings like reference characters designate like parts. In the snubbers used for Chrysler and certain other trucks the snubbing unit is separate and apart from the side frame and bolster and is connected either to the bolster and side frame or, as in the Chrysler truck, to the bolster and spring plank. In the Chrysler truck the fastening means extending from the opposite ends of the snubber cylinder are connected to the bolster and spring plank or to the extensions secured to these members. The ends of the bolts or securing means project axially from the snubber cylinder and consequently, it has been found that in the application of these snubbers to Chrysler trucks the mechanic often secures one end with a wrench, but thinks the securing means is continuous and therefore it is unnecessary to use a wrench on the opposite end of the snubber. To avoid these difficulties and to provide a snubber in which slack cannot develop between the connections I have designed the snubber construction as will now be described in detail.

Within the barrel 1 of a snubber housing there is provided a plurality of friction shoes 2. The friction shoes are preferably symmetrical with wedging projections 3 extending inwardly or radially of the shoe. These wedging projections have oppositely facing wedge faces 4 and 5, the wedge faces 4 being engaged by the head 6 of the bolt 7. The wedge faces 5 are engaged by a pyramidal wedge 8 which is slidably mounted on the bolt 7. Interposed between the flat face of the wedge 8 and the face 9 of the washer or plate 10 is a spring 11 which, through its engagement with the wedge 8 and through the reaction of the washer 10 against the bolt 7 brings the wedge faces 4a of the bolt into wedging engagement with the wedging faces 4 and 5 so as to press the shoes outwardly against the interior of the casing 1. Secured to the end of the casing 1 opposite the end occupied by the washer 10 is a collar or plate 12 which seats within a recess 13 in the cylinder and closes the end of the casing. The collar 12 has an integral cylindrical portion 14 which surrounds the shank 15 of a bolt 16, the reduced end 17 of the bolt passing through an opening 18 in the washer 19. The washer 19 in the normal position of the parts is spaced from the end 21 to which it is firmly secured as by a threaded nut 20 of the cylinder portion 14 of the collar 12.

Figures 1, 2:
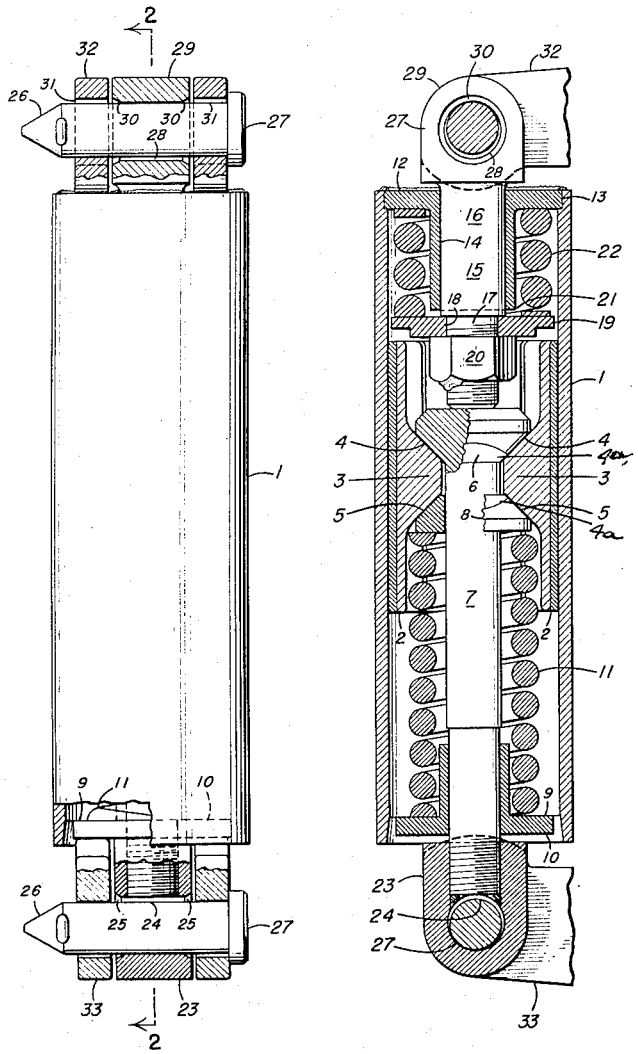
Figure 1 is a front elevational view partially in section showing a snubber unit embodying my invention and connected at opposite ends to clevis members provided on parts of the car truck by driven pins.
Figure 2 is a transverse longitudinal sectional view of Figure 1 taken at right-angles to the direction of view of that figure, being a section on the line 2—2 of Figure 1.

The parts illustrated in Figure 2 show the limit of movement when the bolster has approached the spring plank to the maximum extent. Consequently, when the bolster is returned to normal position the casing 1 is caused to move with the bolster by reason of the spring 22, the washer 19 and the bolt 16, thus causing a relative movement between the casing and the friction shoes and allowing the spring 11 to protrude from the lower end of the casing as clearly shown in Figure 4.

Secured to the lower end of the bolt 7 is an eye 23 having formed therein an opening 24. The side edges of the opening on both sides of the eye 23 are inwardly tapered as at 25 to cooperate with the tapered portion 26 of the securing pin 27. A corresponding opening 28 is formed in the head 29 of the bolt 15 and the lateral edges of this opening 28 are likewise beveled or tapered as at 30 to engage the tapered portion 26 of a headed pin 27. The numeral 31 designates the perforated ends of the bolster bracket 32, one form of which is in Figure 5. The numeral 33 designates a clevis portion secured to the spring plank 34 illustrated in Figure 4.

It will be noted that the clevis 33 is provided with openings corresponding with the openings 24 and 28 within the snubber eyes. In the normal position of the parts these openings overlap, but corresponding portions are not concentric. Consequently, when the pin 27 passing through one of the openings in the arm of the clevis 32 or 33 engages the beveled or tapered edge of the cooperating eye 23 or the opening 28, and when the pin is forced through the eye and seats in the opening of the other arm of the clevis, the eye members of the snubber are forced outwardly with reference to the casing and the springs 11 and 22 are placed under additional compression.

Preferably the capacity of the spring 22 exceeds the capacity of the friction and spring member of the snubber so that the bolt 16 is maintained in its position illustrated in Figure 2 irrespective of the strain imposed on the snubber sleeve by the friction shoes 2 and the spring 11. In this way connection between the snubber and the clevis 32 or 33 is constantly maintained without slack and the wear of the snubber connection does not cause slack.

It is often difficult to provide on the spring plank 34 a portion into which the bolt 27 may be driven. In order to overcome this disadvantage there may be provided in the spring plank a recess 35, Figure 4, into which is welded the seat or clevis 36 having depending ears 37. The upper faces of the ears are provided with a curved cam surface 38, and instead of providing a screw-threaded eye 23 at the lower end of the snubber (as shown in Figures 1 and 2), I have provided a hook-shaped member 39 (see Figure 4) which is threadably connected to the shank of the bolt 7. Clearance is provided as at 40 so that the hook 39 may be rotated within the recess at 40 and about the pin as a center. No change is made in the relation of brackets carried by the bolster, with the eye member 29 formed in the head 16. The openings 23a in the members 37 are elongated for the purpose now to be described.

To assemble the parts, the pin 27 is inserted within the openings 23a. It is, of course, to be understood that the pin 27 can be formed integral with the ears 37a as shown at 27b in Figures 3d, 6 and 7 or separate as illustrated in Figures 1 to 5, inclusive. The snubber is then positioned in a substantially horizontal plane and the hook 39 inserted over the pin 27. The snubber is then rotated in a clockwise direction. The washer 10 engages the cam surface 38 and as the rotation of the snubber is continued the spring 11 is compressed, causing the pin 27 to engage the upper portions of the openings 23a, and when the eye 29 of the bolt 16 is in substantial alignment with the openings in the clevis 32 the pin 27 is driven through the overlapping openings, increasing the compression of the springs 22, and the snubber is thus locked in assembled position under the desired amount of precompression.

Figure 3A:
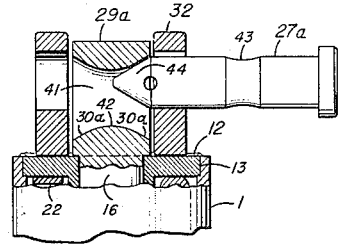
Figures 3a and 3b are fragmentary sectional views showing a modified form of pin and connector for the clevis members, illustrated in connection with the upper or bolster end of the snubber.
Figure 3B:
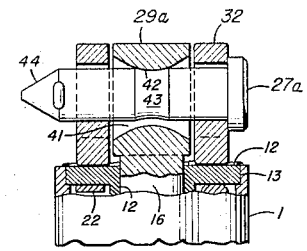

Referring now to Figures 3a and 3b, I have shown a slight modification in the securing pin 27 and the eye 28 formed in the head 29 of the bolt 16. The opening 41 formed in the eye 39a is in the shape of a venturi, that is, its minimum diameter is greater than the maximum diameter of the pin 27a and the beveled surfaces merge into a curved portion 42, which portion corresponds to a concave surface 43 formed in the periphery of the pin 27a and intermediate its ends. Referring to Figure 3a, it will be seen that when the conical head 44 of the pin 27a engages one of the surfaces 30a, and as the pin is driven in, the lower edge of the pin seats against the bottom of the recess in the clevis member 32 and causes the head 29a of the bolt 16 to rise and compress the spring 22 (Figure 2) until the surface 43 of the pin 27a engages and seats against the surface 42, thus allowing a slight return of the spring 22 towards its normal position.

Heretofore any lateral movement of the snubber caused by a lateral relative movement between bolster and car truck has forced the snubber to rock on the pin 27 and since the surface of the opening in the eye was parallel with the surface of the pin any rocking required angling of the eye surface of the pin to the detriment of the pin and to the surface of the eye in engagement therewith. By providing the pin and eye with surfaces 42 and 43, which are arcuate and coradial in cross-section (the term "coradial" as here employed meaning "having a common radius"), the snubber can now rock laterally, and relative longitudinal movement of the bolster with reference to the side frame is freely permitted in both the forms shown in preceding figures, as well as in Figures 3a and 3b. By substituting, therefore, for the pin 27 a pin corresponding to the pin 27a and by providing the eye with a surface 42, I have provided a universal connection between the snubber and the cooperating parts of the side frame and have made it unnecessary to employ yielding gaskets between said side frame and snubber.

Referring now to Figures 6 to 8, inclusive, these figures show a modification of the spring plank 34 shown in Figure 4 by substituting for the pintle 27 an integral member 27b which corresponds to the shape of the pintle shown in Figures 3a, 3b and 5. The insert block 36a is provided with depending ears 37a which are likewise provided with a curved or cam surface 38a, against which the washer 10 engaging the end of the spring 11 is adapted to engage. The operation of this device is, of course, identical with the operation of the device shown in Figure 4.

In Figures 9 and 10 I have substituted for the eye 23 shown in Figures 1 and 2 a threaded member or nut 23b having integral trunnions 45 projecting outwardly on opposite sides of the nut. These trunnions are adapted to engage in correspondingly formed recesses 46 on opposite side of the slot 47 formed in the spring plank so that when the trunnions engage within the recesses in the spring plank the shock absorber can be rotated in a clockwise direction causing the follower 10 to engage with the cam surfaces 38b to give the spring 11 a slight additional pressure.

Figure 3C:
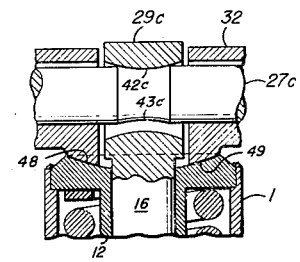
Figure 3c is also a fragmentary view of a further modification of the connection between snubber and bolster.
Figure 3D:
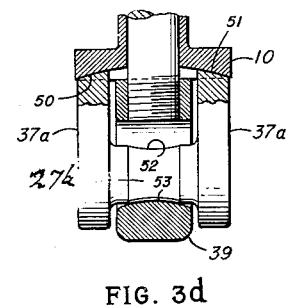
Figure 3d is a similar view of the same type of connection used, however, between the spring plank and snubber.

The modified form of upper and lower snubber connections shown in Figures 3c and 3d differs from those of the preceding figures primarily in providing line contact between the confronting faces of the several elements connecting the snubber and side frame during angling of the snubber longitudinally of the frame. For this purpose, the concave surface 43c of the securing pin 27c and the engaging surface 42c of the eye 29c of the bolt 16 are of equal radius, and the upper face 48 of the collar 12 is dished and the lower edges 49 of the clevis 32 are swung on co-radial arcs concentric on any section, within the range of lateral movement of the snubber, with the arc of the corresponding upper extremity of the surface 42c. The dishing or concaving of the lower face 50 of the washer 10 is similar to that of the upper face 48 of the collar. Thus, both the lower face 50 and the engaging surfaces 51 of the connecting members 37a are co-radial and concentric, on any section within the range of lateral movement of the snubber, with the arcs about which the corresponding lower end of the concave surface 52 of the lower securing member is struck. The remaining engaging element, the hook 39, has a convex inner face 53 on its lower portion which is co-radial with the concave surface 52. With this construction, which may be applied equally to the engaging surfaces of the other illustrated forms of connections, all of the engaging surfaces will remain in line contact within the limits of angling of the snubber both longitudinally and laterally of the side frame.

Having now described my invention and the various embodiments thereof which I have illustrated in the attached drawings, what I claim and desire to secure by Letters Patent is:

1. The combination with side frame and bolster members of a snubber interposed between said members, said snubber including a casing, friction units and an energizing spring within said casing, a second spring within said casing, and means extending without said casing for placing said last named spring under compression to prevent slack from developing between said casing and said first named members.

2. The combination with side frame and bolster members of a snubber interposed between and connected to each of said members, said snubber including a casing, friction units and an energizing spring within said casing, a second spring within said casing, and means including a bolt extending through said second spring for placing the latter under compression, said bolt serving as the connection between said bolster and said snubber.

3. The combination with a side frame member, a bolster member and a spring plank, of a snubber interposed between said bolster and spring plank for resisting relative movement of said members, and means for connecting one end of said snubber to said bolster, said means including apertured members on said bolster, a coacting member on one end of said snubber, and a pin having a driven fit with the two apertured members and the adjacent coacting member for connecting said snubber to said bolster.

4. The combination with a side frame member, a bolster member and a spring plank, of a snubber interposed between said bolster and spring plank for resisting relative movement of said members, means for connecting one end of said snubber to said bolster, said means including apertured members on said bolster, a coacting member on one end of said snubber, and a pin having a driven fit with the two apertured members and the adjacent coacting member for connecting said snubber to said bolster, and means for connecting the opposite end of said snubber to said spring plank.

5. The combination with a side frame member, a bolster member and a spring plank, of a snubber interposed between said bolster and spring plank for resisting relative movement of said members, said snubber comprising a casing, friction units and an energizing spring within said casing, a second spring within said casing and normally spaced from said friction units, and means for connecting the one end of said snubber to said bolster, said means including apertured members on said bolster, a coacting member on one end of said snubber, and a pin having driven fit with the two apertured members and the adjacent coacting member for connecting said snubber to said bolster.

6. The combination with a side frame member, a bolster member and a spring plank, of a snubber interposed between said bolster and spring plank for resisting relative movement of said members, said snubber comprising a casing, friction units and an energizing spring within said casing, a second spring within said casing and normally spaced from said friction units, means for connecting one end of said snubber to said bolster, said means including apertured members on said bolster, a coacting member on one end of said snubber, a pin having driven fit with the two apertured members and the adjacent coacting member for connecting said snubber to said bolster, said pin having an annular groove engageable with a substantially coradial concentric surface on said coacting member, means normally urging said surface into said groove for locking said pin in connecting position, and means for connecting the opposite end of said snubber to said spring plank.

7. The combination with a side frame member, a bolster member and a spring plank, of a snubber interposed between said bolster and spring plank for resisting relative movement of said members, said snubber comprising a casing, friction units and an energizing spring within said casing, a second spring within said casing and normally spaced from said friction units, a bolt adapted to actuate the friction units, said bolt having a hooked end arranged to engage a portion rigid with the spring plank for connecting one end of the snubber thereto, and means for connecting the opposite end of said snubber to said bolster, said means including apertured members on said bolster, a coacting member on said snubber, and a pin having a driven fit with the two apertured members and the adjacent coacting member.

8. A connection for a plurality of members movable relative to each other about a plurality of angularly disposed axes comprising an apertured portion rigid with one of said members, a part of another of said members overlapping said apertured portion, a pin seated in said apertured portion and projecting through said part, said pin having an annular groove engageable with a substantially coradial concentric surface on said part, and means normally urging said surface into said groove for locking said pin in member-connecting position.

9. A connection for a plurality of members rotatable relatively about a plurality of angularly disposed axes comprising spaced portions on one of said members, a part on said other member and straddled by said portions, a pin connecting said portions and projecting through said part, said pin intermediate said portions having an annular groove substantially coradial and concentric with a surface of said part, and means normally urging said surface into said groove for locking said pin in member-connecting position.

10. In a connection for a plurality of members rotatable relatively about a plurality of angularly disposed axes and having apertured overlapping parts, a headed pin having a tapered end and an annular groove of arcuate cross-section intermediate its ends, said groove being engageable with a correspondingly arcuate surface on said part of one of said members for locking said pin in member-connecting position.

11. In a railway truck the combination with a supporting member and a bolster spring-supported thereon, of a snubber connecting said members, said snubber including a casing and friction and spring means within said casing, and means connecting said snubber to one of said members including cam means for compressing said spring means on assembly of said snubber and said one member.

12. In a railway truck the combination with a supporting member and a bolster member spring-supported thereon, of a snubber interposed between said members, said snubber including a casing and friction and spring means within said casing, and means connecting said snubber to said members including cam means for compressing said spring means on assembly of said snubber and members.

13. In a railway truck the combination with a supporting member and a bolster member spring-supported thereon, of a snubber interposed between said members, said snubber including a casing and friction and spring means within said casing, fastening means projecting from each end of said snubber and engaging said spring means, means on each of said members and connectable to the adjacent of said fastening means, and cam means associated with said connectable means and operable through said projecting means for compressing said spring means on assembly of said snubber and members.

14. In a railway truck the combination with a supporting member and a bolster member spring-supported thereon, of a snubber connecting said members, said snubber including a casing and friction and spring means in said casing, an apertured bracket on one of said members, fastening means projecting from an end of said snubber adjacent said bracket, means for connecting said fastening means to said bracket, and plate means encircling said fastening means and urged by said spring means into bearing engagement with said bracket, said plate means and bracket having substantially coradial concentric engaging faces for maintaining engagement therebetween on relative universal movement of said snubber and one member about the common center of said surfaces.

15. In a railway truck the combination with a supporting member and a bolster member spring-supported thereon, of a snubber connecting said members, said snubber including a casing and friction and spring means in said casing, an apertured bracket on one of said members, fastening means projecting from an end of said snubber adjacent said bracket, a pin seated in said bracket and projecting through said fastening means, said pin having an annular groove intermediate ends thereof engageable with a substantially coradial concentric surface on said fastening means, plate means encircling said fastening means and normally urged by said spring means into bearing engagement with said bracket for locking said pin in connecting position through said surface and groove, and substantially coradial engaging surfaces on said plate means and bracket, said surfaces being substantially concentric with said first named surface and groove for maintaining engagement between said several surfaces during relative universal movement of said snubber and one member.

16. A connection between a plurality of members rotatable relatively about a plurality of angularly disposed axes comprising spaced apertured portions on one of said members, plate means on another of said members, a part projecting from said other member through said plate means, spring means acting against said plate means for urging said part inwardly of said other member, said part having an aperture normally held by spring means eccentric of said apertures of said portions, a pin seated in said apertures for connecting said portions and part, said pin having an annular groove, and a convex inner surface on said part engageable and substantially coradial and concentric with said groove for locking said pin in member-connecting position.

17. A connection between a plurality of members rotatable relatively about a plurality of angularly disposed axes comprising spaced apertured portions on one of said members, plate means on another of said members, a part projecting from said other member through said plate means, spring means acting against said plate means for urging said part inwardly of said other member, said part having an aperture normally held by spring means eccentric of said apertures of said portions, a connecting pin drivable through said apertures and having a tapered end for aligning said part and portions during connection thereof, said pin having an annular groove, and a convex inner surface on said part engageable and substantially coradial and concentric with said groove for locking said pin in member-connecting position.

18. In a railway truck the combination with a supporting member and a bolster member spring-supported thereon, of a snubber connecting said members, said snubber including a casing and friction and spring means within said casing, fastening means projecting from an end of said casing and acting on an inner end of said spring means, plate means on said fastening means and bearing against an outer end of said spring means, a bracket on said member adjacent said fastening means and interlockable therewith, and a cam surface on said bracket and engageable with said plate means for compressing said spring means on assembly of said snubber and one member.

19. In a railway truck the combination with a supporting member and a bolster member spring-supported thereon, of a snubber connecting said member, said snubber including a casing and friction and spring means within said casing, fastening means projecting from an end of said casing and acting on an inner end of said spring means, plate means on said fastening means and bearing against an outer end of said spring means, hook means on said fastening means outwardly of said plate means, a bracket on one of said members, pin means associated with said bracket and engageable by said hook means, and a cam surface on said bracket and acting against said plate means for compressing said spring means during assembly of said snubber and one member.

References Cited in the file of this patent

UNITED STATES PATENTS

| | | |
|---|---|---|
| 610,768 | Moyer et al. | Sept. 13, 1898 |
| 845,121 | Reniff | Feb. 26, 1907 |
| 1,019,504 | McCombs | Mar. 5, 1912 |
| 2,574,788 | Jenway et al. | Nov. 13, 1951 |